(12) United States Patent
Drube et al.

(10) Patent No.: US 6,692,034 B2
(45) Date of Patent: Feb. 17, 2004

(54) BREAKAWAY DEVICE FOR FUELING STATIONS

(75) Inventors: Thomas K. Drube, Lakeville, MN (US); Jesse Gamble, Minneapolis, MN (US); Gilbert J. Bily, New Prague, MN (US)

(73) Assignee: Chart Inc., Burnsville, MN (US)

( * ) Notice: Subject to any disclaimer, the term of this patent is extended or adjusted under 35 U.S.C. 154(b) by 99 days.

(21) Appl. No.: 10/054,813

(22) Filed: Oct. 29, 2001

(65) Prior Publication Data

US 2003/0080551 A1 May 1, 2003

(51) Int. Cl.[7] ................................. F16L 35/00
(52) U.S. Cl. ..................... 285/2; 285/3; 137/68.14; 141/382
(58) Field of Search ................. 285/1, 2, 3, 4; 141/86, 311 A, 382; 137/797, 68.27, 70, 71

(56) References Cited

U.S. PATENT DOCUMENTS

| | | | | |
|---|---|---|---|---|
| 423,093 A | * | 3/1890 | Sweetland ................ 285/1 |
| 2,062,381 A | * | 12/1936 | Tryon et al. ............. 285/2 |
| 2,078,733 A | * | 4/1937 | Ryan ..................... 285/2 |
| 2,514,717 A | * | 7/1950 | Power .................... 285/1 |
| 4,090,524 A | * | 5/1978 | Allread et al. ........... 285/2 |
| 4,791,961 A | * | 12/1988 | Nitzberg et al. .......... 285/1 |
| 4,854,338 A | * | 8/1989 | Grantham ................ 285/4 |
| 4,898,199 A | * | 2/1990 | Morris et al. ............ 285/2 |
| 4,899,792 A | | 2/1990 | Podgers | |
| 5,014,732 A | * | 5/1991 | Nitzberg ................. 285/2 |
| 5,018,546 A | * | 5/1991 | Carmack et al. .......... 285/2 |
| 5,050,911 A | | 9/1991 | Morrison | |
| 5,285,807 A | * | 2/1994 | Nitzberg ................. 285/2 |
| 5,297,574 A | | 3/1994 | Healy | |
| 5,397,155 A | * | 3/1995 | Inda et al. ............... 285/4 |
| 5,454,602 A | | 10/1995 | Anderson et al. | |
| 5,520,418 A | | 5/1996 | Burke | |
| 5,564,471 A | | 10/1996 | Wilder et al. | |
| 5,570,719 A | | 11/1996 | Richards et al. | |
| 5,695,221 A | | 12/1997 | Sunderhaus | |
| 5,765,587 A | * | 6/1998 | Osborne ................. 285/4 |
| 6,050,297 A | | 4/2000 | Ostrowski et al. | |
| 6,123,123 A | | 9/2000 | Carder, Sr. et al. | |
| 6,161,872 A | | 12/2000 | Vranicar | |

* cited by examiner

Primary Examiner—David Bochna
(74) Attorney, Agent, or Firm—Piper Rudnick LLP

(57) ABSTRACT

A breakaway device joins a portion of a dispensing hose that is connected to a fueling station with a portion of a dispensing hose that is joined to a coupling that connects to a vehicle during fueling. The breakaway device includes a pair of leg members that are joined by their proximal ends to the dispensing hose portions. The distal ends of the leg members are joined at an angle to a frangible member that includes a pair of inner segments that are joined in an abutting fashion by a surrounding frangible sleeve. When a driveaway occurs, the leg members are pulled apart and exert a bending moment on the frangible member. As a result, the frangible member breaks which prevents significant damage to the station. A pneumatic line that provides pressurized air to open the station dispensing valve is attached to each leg member so that when the frangible member breaks, the pneumatic line is ruptured so that pressurized air is no longer delivered to the dispensing valve. As a result, the dispensing valve closes and fuel is no longer delivered to the dispensing hose.

20 Claims, 3 Drawing Sheets

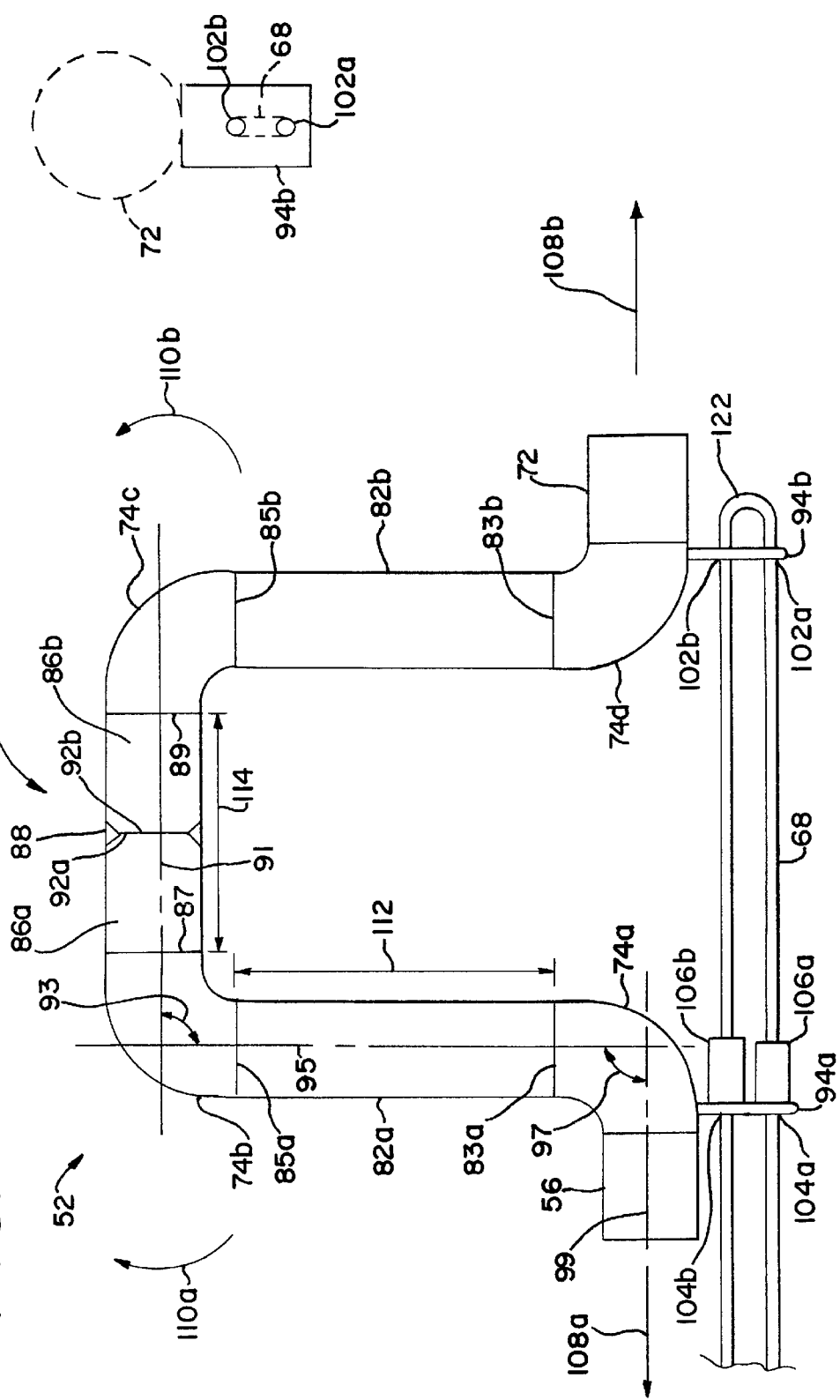

BREAKAWAY DEVICE FOR FUELING STATIONS

BACKGROUND OF THE INVENTION

The present invention relates generally to fueling stations and, more particularly, to a breakaway device for shutting down a fueling station when a vehicle drives away with the dispensing hose of the fueling station attached thereto.

Both alternative fuels, such as liquid natural gas (LNG), and more conventional fuels, such as gasoline, are dispensed to vehicles via fueling stations. A fueling station typically includes a storage tank holding a supply of fuel, a dispensing hose with a coupling or nozzle that may be removably connected to a vehicle's fueling port and a pump in series between the storage tank and the dispensing hose for transferring the fuel from the storage tank to the vehicle tank. In the case of LNG or other cryogenic fuels, the fueling station typically includes a conditioning arrangement so that the fuel may be warmed and/or pressurized before delivery to the vehicle. Fueling stations often feature a housing containing some of the system components with the dispensing hose attached to a side of the housing.

In nearly all fueling stations in the United States, and in many other countries, a breakaway device is installed to the dispensing hose to avoid damage to the fueling station and/or the vehicle being fueled in the event that a user drives away from the fueling station without first disconnecting the dispensing hose from the vehicle. Even with breakaway devices, such "driveaways" can result in substantial repair costs for fueling station operators. In addition, a driveaway is harmful for the environment, and possibly for individuals as well, if a large amount of fuel is spilled.

Breakaway devices are manufactured by many companies and have various constructions. Virtually all include two pieces which are intended to uncouple when a vehicle drives away from the fueling station with the dispensing hose nozzle or coupling still connected to the vehicle.

Breakaway devices are commonly installed with one piece connected to the fueling station housing and the other piece connected to the end of the dispensing system hose that is opposite the end that is equipped with the coupling or nozzle. In one example of such an arrangement, the LNG outlet of the fueling station housing is equipped with a vertical brass nipple over which the dispensing hose is placed. A chain is attached between the dispensing hose and an emergency fueling station shutoff valve. As a result, when a driveaway occurs, the dispensing hose is pulled off of the brass nipple and the chain is pulled so that the emergency valve is closed. The chain is sized so as to break in the event that the vehicle continues to drive away from the fueling station. While such an arrangement reduces system damage and stops the flow of fuel from the station, the junction between the dispensing hose and the nipple has a tendency to leak and may also bind when a driveaway occurs so that the fueling station suffers increased damage.

Improved breakaway devices that connect between and to the fueling station housing and the dispensing hose are illustrated in U.S. Pat. No. 5,520,418 to Burke and U.S. Pat. No. 6,161,872 to Vranicar. The Vranicar '872 patent, however, is primarily directed to a device that prevents binding of the dispensing hose as it is pulled off of the nipple/male connector of the fueling station housing. As such, the breakaway arrangement of the Vranicar '872 patent still suffers from leak and hose spill issues. The Burke '418 patent also prevents binding of the dispensing hose and, in addition, provides an improved junction between the dispensing hose and the fueling station housing. The dispensing hose of the Burke '418 patent includes a valve that shuts when a driveaway occurs. The valve stays with the dispensing hose after the driveaway so that the fluid within the hose does not spill onto the ground. One must contend with the fluid in the entire length of the hose when reconnecting it to the fueling station, however. In addition, while improved, the junction of the Burke '418 patent is still susceptible to leakage issues.

Very accurate metering of cryogenic liquids during dispensing is sometimes required. The above breakaway devices all feature connectors that are attached to the fueling station housing in a vertical configuration. As a result, the hoses connected to the breakaway devices feature low points wherein liquid may be trapped after dispensing. The cryogenic liquid trapped in the hose must be vaporized and vented from the hoses before accurate dispensing may resume. A breakaway device that permits liquid in the hose to be drained after dispensing is thus desirable when accurate metering is required.

Alternative breakaway device arrangements feature couplings that are positioned in the dispensing hose a distance away from the fueling station housing. An example of such an arrangement is presented in U.S. Pat. No. 5,050,911 to Morrison. The Morrison '911 patent illustrates a device that includes male and female members that are inserted into adjacent sections of the dispensing hose. An O-ring is positioned between the overlapping joined male and female members as is a frangible locking ring. In the event of a driveaway, the locking ring breaks so that the male member may be pulled out of the female member. As a result, one of the formerly adjacent hose sections remains connected to the fueling station housing while the other remains connected to the nozzle and vehicle. While the device of the Morrison '911 patent is effective, its O-ring seal is susceptible to leakage. This is especially true in the case of cryogenic liquids where thermal cycling occurs at cryogenic temperatures. In addition, the device does not automatically stop the fueling station from operating in the event of a driveaway.

Several alternative breakaway devices include connectors that are integrated into dispensing hoses and that include valves which close when the hose sections that are joined by the connectors are pulled apart. More specifically, each half of the connector in such an arrangement includes a valve that activates during a driveaway so that fluid within each hose section is not spilled onto the ground. Examples of such an arrangement are presented in U.S. Pat. No. 5,297,574 to Healy; U.S. Pat. No. 5,454,602 to Anderson et al.; U.S. Pat. No. 5,564,471 to Wilder et al.; U.S. Pat. No. 5,695,221 to Sunderhaus; U.S. Pat. No. 5,570,719 to Richards et al.; and U.S. Pat. No. 6,050,297 to Ostrowski et al. The breakaway devices of these patents, however, are complicated and feature many separate parts. This increases their cost of manufacture and the chance of malfunctions.

Accordingly, it is an object of the present invention to provide a breakaway device for fueling station dispensing hoses that minimizes damage to the fueling station and vehicle in the event of a driveaway.

It is another object of the present invention to provide a breakaway device for fueling station dispensing hoses that limits the amount of fluid spilled in the event of a driveaway.

It is another object of the present invention to provide a breakaway device for fueling station hoses that permits liquid remaining in the hose after dispensing to be drained.

It is another object of the present invention to provide a breakaway device for fueling station dispensing hoses that operates in a consistent and reliable fashion.

It is still another object of the present invention to provide a breakaway device for fueling station dispensing hoses that does not leak during fuel delivery.

It is still another object of the present invention to provide a breakaway device for fueling station dispensing hoses that automatically stops the delivery of fuel by the station in the event of a driveaway.

It is still another object of the present invention to provide a breakaway device for fueling station dispensing hoses that is economical to produce.

Other objects and advantages will be apparent from the remaining portion of the specification.

SUMMARY OF THE INVENTION

The present invention is directed to a breakaway device for fueling station dispensing hoses. The breakaway device joins first and second portions of the dispensing hose where the first dispensing hose portion is connected to the fueling station and the second dispensing hose portion is connected to a coupling that connects to a vehicle during fueling. The breakaway device prevents significant damage to the station and spillage of fuel in the event of a driveaway.

The breakaway device features a pair of leg pipe members that are connected by their proximal ends to the dispensing hose portions and by their distal ends to a frangible pipe member. The leg members are oriented at an angle relative to the frangible member so that a bending moment acts on the frangible member when opposing forces exerted on the dispensing hose portions, such as during a driveaway, pull the leg members generally away from one another.

The frangible member is constructed to fracture when sum of the opposing forces pulling the proximal ends of the leg members generally away from one another exceeds a predetermined value, preferably around 400 lbs. The frangible pipe member preferably includes inner segments connected to the distal ends of the leg members with their tapered end portions secured in an abutting relationship by a surrounding frangible sleeve.

The breakaway device also includes a pneumatic line bracket attached to the proximal end of each leg member. The brackets receive a pneumatic line that provides pressurized air for opening the station dispensing valve. The pneumatic line is ruptured when the frangible member breaks and the leg members are pulled apart. As a result, the supply of pressurized air to the dispensing valve of the station is interrupted so that it closes and fuel is no longer delivered to the dispensing hose.

The following detailed description of embodiments of the invention, taken in conjunction with the appended claims and accompanying drawings, provide a more complete understanding of the nature and scope of the invention.

BRIEF DESCRIPTION OF THE DRAWINGS

FIG. 3 is an enlarged side elevational view of the breakaway device of FIGS. 1 and 2;

FIG. 4 is an enlarged front elevational view of one of the pneumatic line brackets of the breakaway device of FIGS. 1–3.

DESCRIPTION OF THE PREFERRED EMBODIMENTS

Figure 1:
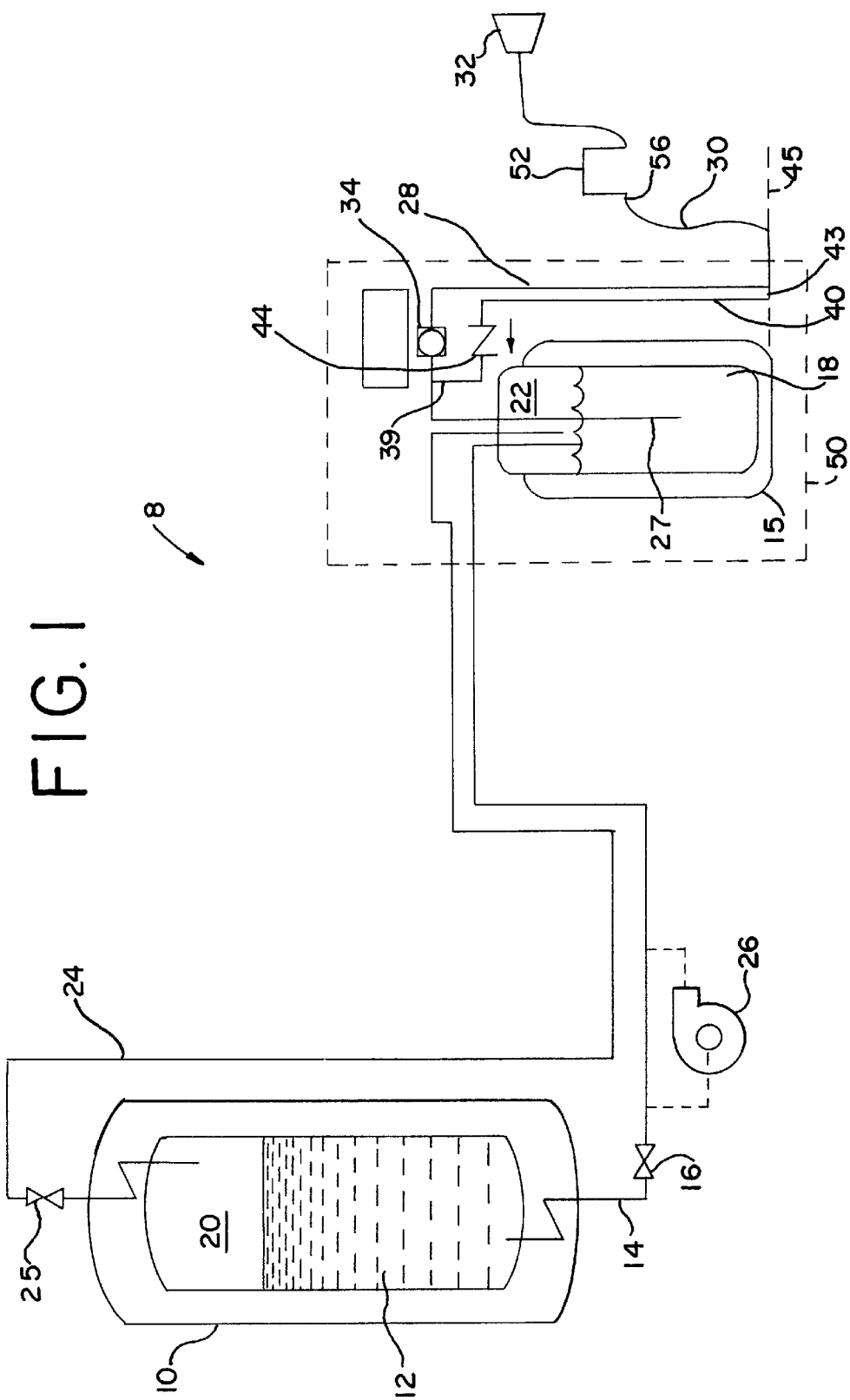
FIG. 1 is a schematic of a fueling station that is equipped with an embodiment of the breakaway device of the present invention.

A fueling station that is equipped with an embodiment of the breakaway device of the present invention is indicated in general at 8 in FIG. 1. The fueling station 8 delivers a metered quantity of Liquid Natural Gas (LNG) to a vehicle. While the breakaway device of the present invention is described below with reference to an LNG fueling station, it is to be understood that the device may be effectively employed in systems or stations that dispense fuels or liquids other than LNG, including both cryogenic and non-cryogenic liquids.

The fueling station 8 includes a jacket-insulated bulk storage tank 10 for storing a large volume of LNG 12. An insulated line 14 connects the storage tank to 10 to a meter sump 15 and includes a shut-off valve 16. Meter sump 15 is partially filled with LNG 18 and the vapor spaces 20 and 22 of storage tank 10 and meter sump 15, respectively, are connected by a vapor return line 24, which also includes a shut-off valve 25. Meter sump 15 features a jacketed construction for insulation purposes.

When dispensing of LNG from the station to a vehicle is desired, LNG is transferred from storage tank 10 to meter sump 15 via pressure differential or the action of a cryogenic liquid pump 26 that is incorporated in line 14. Due to the pressure head within the meter sump 15, LNG therein is displaced by the LNG entering from tank 10 and forced out through dip tube 27, dispensing line 28 and dispensing hose 30 so as to flow into a vehicle tank. Alternatively, the pressure within the meter sump may be sufficient to dispense LNG to the vehicle tank without the introduction of LNG from the storage tank 10. Dispensing hose 30 terminates in a quick-disconnect coupling 32 that may be removably connected to a corresponding coupling on the vehicle. Dispensing line 28 is provided with a pneumatically-operated dispensing valve 34 which, as will be explained in greater detail below, is selectively in communication with a source of pressurized air.

When dispensing of LNG ceases, and dispensing valve 34 is closed, an undelivered volume of LNG remains in the system dispensing hose 30 of FIG. 1. Ambient heating will require that the resulting LNG vapors in the hose be vented. In addition, an unknown volume of LNG remaining in the dispensing hose undermines accurate metering during the next dispensing. Accordingly, it is desirable that the hose be empty at the commencement of dispensing, that is, that the system provide a "dry hose." As illustrated in FIG. 1, the station provides this by the inclusion of a drain line 40 connected on opposite sides of dispensing valve 34. The outlet 39 of the drain line 40 communicates with sump 15 via the portion of the dispensing line 28 proceeding the dispensing valve 34. The inlet 43 of the drain line 40 is connected at the lowest level 45 along dispensing line 28 and hose 30 between the sump 15 and the quick-disconnect coupling 32. Drain line 40 is provided with a check valve 44 to prevent LNG from sump 15 bypassing closed dispensing valve 34. A housing 50 surrounds the meter sump 15, dispensing line 28, dispensing valve 34, drain line 40 and check valve 44.

In operation, at the end of dispensing, the dispensing valve 34 is closed and ambient heat pressurizes the LNG trapped in the hose 30 so that the liquid is quickly forced through drain line 40, check valve 44 and back into sump 15. If the inlet 43 of the drain line 40 was not at the lowest level in the pathway (dispensing line 28 and hose 30) between sump 15 and coupling 32, the LNG would only transfer out of the hose via the drain line as a gas because the liquid would collect at the lowest level in the pathway, away from the drain line inlet 43. This could possibly and undesirably leave LNG in the hose at the commencement of the next dispensing.

An embodiment of the breakaway device of the present invention 52 is positioned in hose 30. The breakaway device is configured to separate into two pieces when a vehicle drives away from the station 8 with the coupling 32 still attached. The breakaway device 52 thus provides driveaway protection while surviving the thermal cycling that occurs when LNG is dispensed. In addition, the breakaway device still permits the inlet 43 of the drain line 40 to be at the lowest level in the pathway between sump 15 and coupling 32. As a result, liquid from the hose drains through drain line 40, passes through check valve 44 and ultimately is deposited in sump 15 so that a dry hose condition is present at the start of the next dispensing cycle.

Figure 2:
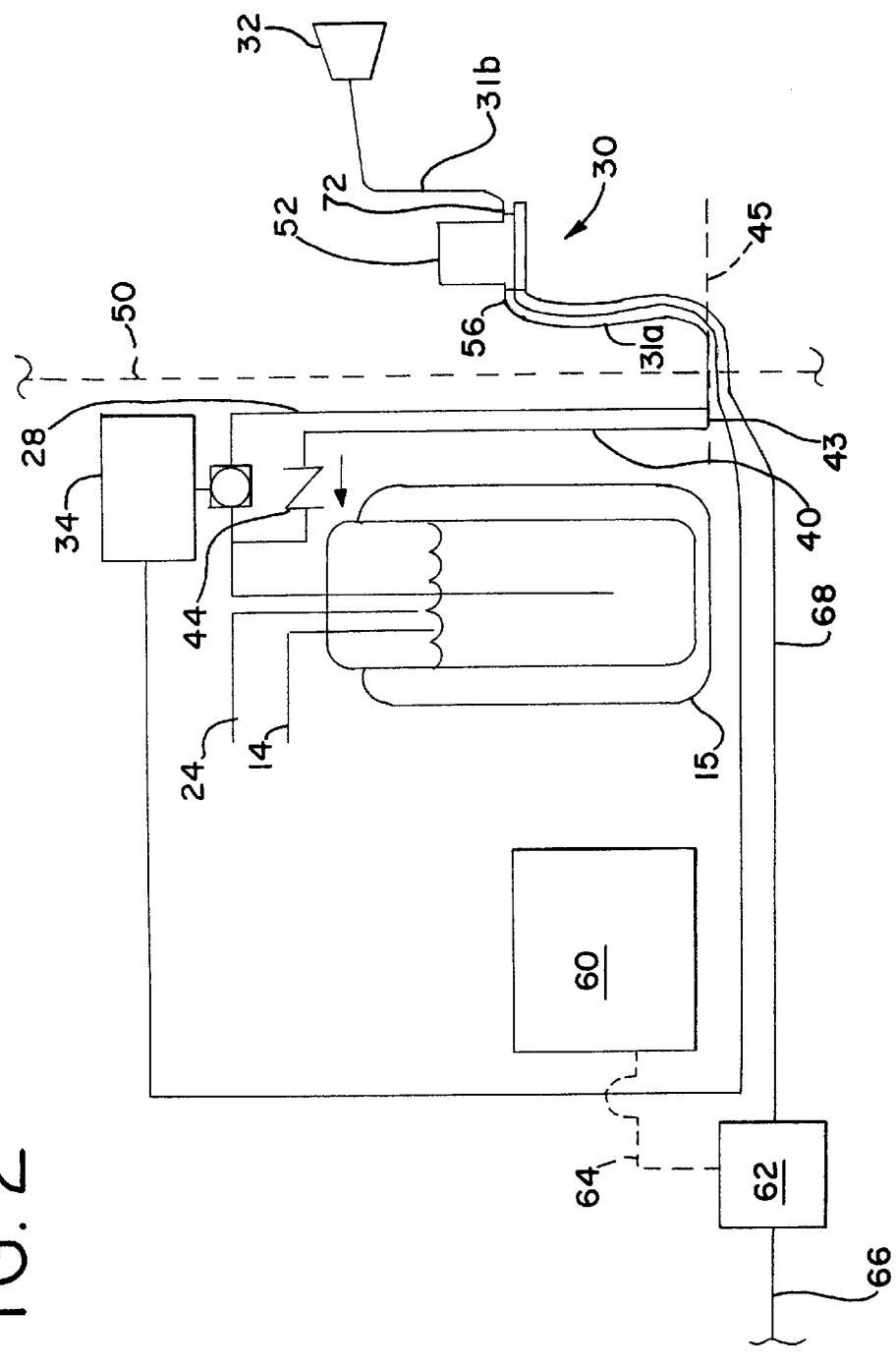
FIG. 2 is an enlarged schematic view of the control system for the fueling station of FIG. 1.

The control system of the fueling station of FIG. 1 is illustrated in FIG. 2. A programmable logic controller 60 communicates with and controls a solenoid valve 62 via wire 64. The solenoid valve 62 receives air from a source of pressurized air (not shown) via line 66. When controller 60 configures solenoid valve 62 to the open position, pressurized air travels through pneumatic line 68 to the pneumatic dispensing valve 34 so that it is also open. In other words, pneumatic dispensing valve 34 is open when it is receiving pressurized air from open solenoid valve 62.

Pneumatic line 68 is preferably constructed from ⅜" brake line tubing. As illustrated in FIG. 2, a portion of pneumatic line 68 runs parallel to the dispensing hose 30 and, as will be explained in greater detail below, is secured at the inlet 56 of the breakaway device 52. The pneumatic line 68 then traverses the breakaway device and is connected at the outlet section 72 of the breakaway device 52. The pneumatic line 68 then makes a U-turn and once again is connected to the outlet section 72 and inlet section 56 of the breakaway device. The pneumatic line 68 then travels to the pneumatic dispensing valve 34.

The breakaway device, indicated in general at 52 in FIG. 3, features an inlet section 56, outlet section 72, elbows 74a–74d and leg pipe members 82a and 82b, all constructed from piping which is capable of withstanding cryogenic liquids and their temperatures or whatever fuel is being dispensed. The leg members have proximal ends 83a and 83b and distal ends 85a and 85b. In the case of LNG, an example of a suitable pipe material is 304 stainless steel. The breakaway device also includes a frangible cross member, indicated in general at 84, that has an inlet end 87 connected to elbow 74b and an outlet end 89 connected to elbow 74c so as to extend between the distal ends 85a and 85b of leg members 82a and 82b.

The longitudinal axis 91 of frangible member 84 preferably makes an angle 93 of approximately 90° with the longitudinal axis 95 of each leg member. Leg member 82a preferably also makes an angle 97 of approximately 90° with the longitudinal axis 99 of inlet section 56. The angle between the longitudinal axes of leg member 82b and outlet section 72 is also preferably 90°. As a result, the members and elbows of the breakaway device form a loop through which the LNG travels as it is being dispensed. It should be noted that while straight pipe members are illustrated for the leg and frangible members with 90° angles between each, the pipe and frangible members may be curved and the angles may differ so that breakaway device 52 has more of an arc-shaped or inverted U-shaped profile.

The frangible cross member preferably is constructed from inner segments 86a and 86b which are attached to elbows 74b and 74c, respectively. The end portions 92a and 92b of inner segments 86a and 86b are joined in an abutting fashion by a sleeve 88 and are tapered slightly. While inner segments 86a and 86b are constructed of the same material as the elbows, leg members and cross member of the breakaway device, the sleeve is constructed of a relatively brittle material such as brass and fits around inner segments 86a and 86b in an interference fit fashion. It should be noted that, as an alternative to the multi-piece construction illustrated in FIG. 3, the frangible cross member 84 could be constructed from a single-piece pipe section. Either arrangement is much less prone to leakage than an O-ring sealing arrangement.

The pneumatic line 68, as described previously, traverses the breakaway device in a parallel configuration. The parallel portions of the pneumatic line are attached to elbows 74a and 74d of the breakaway device by pneumatic line brackets 94a and 94b. As illustrated in FIG. 4, bracket 94b is essentially a tab that features openings 102a and 102b. Bracket 94a features the same construction and includes openings 104a and 104b (FIG. 3). Brackets 94a and 94b preferably are constructed from stainless steel and are secured to their respective elbows by weldment. The pneumatic line 68 passes through opening 104a of bracket 94a and then opening 102a of bracket 94b. The pneumatic line then makes a U-turn and passes through opening 102b of bracket 94b and opening 104b of bracket 94a. Collars 106a and 106b secure the parallel portions of pneumatic line 86 to bracket 94a. Collars 106a and 106b are constructed of stainless steel and are secured to the pneumatic line by a compression fitting and to the bracket 94a by a threaded connection.

When a driveaway occurs, that is, when a vehicle drives away from the fueling station 8 of FIG. 1 with the coupling 32 still attached to the vehicle, the breakaway device 52 of FIG. 3 is subjected to opposing forces in the directions indicated by arrows 108a and 108b. Due to leg members 82a and 82b, frangible cross member 84 is subjected to a predictable bending moment indicated by arrows 110a and 110b. Under the influence of the bending moment, the end portions 92a and 92b of inner segments 86a and 86b pivot against one another aided by their tapered design. As the end portions of the inner segments pivot against one another, the sleeve 88 of the cross member eventually fractures or breaks and inner segments 86a and 86b are separated from one another. As a result, leg member 82a and inner segment 86a remain attached to first dispensing hose portion 31a (FIG. 2), which remains attached to the station housing 50. In contrast, leg member 82b and inner segment 86b remain attached to second dispensing hose portion 31b (FIG. 2), and thus to coupling 32 which is still connected to the vehicle.

The breakaway device 52 fractures into two pieces preferably when the sum of the forces acting thereon in the directions indicated by arrows 108a and 108b totals to 400 lbs. When the sleeve is constructed of brass having a wall thickness of approximately 0.030 inches, and angles 93 and 97 (FIG. 3) are approximately 90°, it has been found that a length for the leg members (112 in FIG. 3) of approximately six inches with a length for the frangible cross member (114 in FIG. 3) of approximately three inches results in the breakage device fracturing when the forces acting on the device in the directions of arrows 108a and 108b total to 400 lbs.

As the leg members 82a and 82b are rotated away from one another, in the directions of arrows 110a and 110b in FIG. 3, bracket 94b engages the U-turn 122 of pneumatic line 68 and pulls it away from bracket 94a and the section of pneumatic line 68 secured thereto. Due to the resulting strain placed on the parallel portions of pneumatic line 68, it eventually ruptures between brackets 94a and 94b so that the flow of pressurized air to automated dispensing valve 34 is interrupted. This results in pneumatic dispensing valve 34 closing so that the transfer of LNG from the meter sump 15 to the dispensing line 28 and hose 30 is halted.

The small amounts of pressurized LNG remaining in hose portion 31*a*, that remains attached to the station housing 50, and hose portion 31*b*, that remains connected to the vehicle, spray onto the ground and quickly evaporates.

While the preferred embodiments of the invention have been shown and described, it will be apparent to those skilled in the art that changes and modifications may be made therein without departing from the spirit of the invention, the scope of which is defined by the appended claims.

What is claimed is:

1. A breakaway device for joining first and second portions of a dispensing hose of a fueling station, where the first dispensing hose portion is connected to the fueling station and the second dispensing hose portion is connected to a coupling that is adapted to removably connect to a vehicle during fueling, the breakaway device comprising:
   a) a pair of leg pipe members, each having a distal end and a proximal end, the proximal end of a first one of said leg members adapted to be connected to the first dispensing hose portion and the proximal end of a second one of said leg members adapted to be connected to the second dispensing hose portion;
   b) a frangible pipe member having an inlet end and an outlet end, the inlet end of said frangible member connected to the distal end of the first leg member and the outlet end of said frangible member connected to the distal end of the second leg member, said leg members oriented at an angle relative to said frangible member so that a bending moment acts on said frangible member when opposing forces pull the proximal ends of the leg members generally away from one another; and
   c) said frangible member constructed so as to fracture when sum of the opposing forces pulling the proximal ends of the leg members generally away from one another exceeds a predetermined value; and
   d) a first bracket attached to said first leg member and a second bracket attached to said second leg member, said first and second brackets adapted to receive a pneumatic line for operating a dispensing valve of the fueling station so that said pneumatic line is ruptured when said frangible member is ruptured and said first and second leg members are pulled apart.

2. The breakaway device of claim 1 wherein said frangible pipe member includes a first inner segment connected to the distal end of the first leg member, a second inner segment connected to the distal end of the second leg member and a sleeve surrounding and joining said first and second inner segments.

3. The breakaway device of claim 2 wherein said first and second inner segments each have an end portion with said end portions configured in an abutting arrangement when surrounded and joined by said sleeve.

4. The breakaway device of claim 3 wherein said end portions are tapered.

5. The breakaway device of claim 2 wherein said sleeve is constructed of brass.

6. The breakaway device of claim 1 wherein said leg members are secured to said frangible member by elbows.

7. The breakaway device of claim 1 wherein said leg members are positioned generally perpendicular to the frangible member and generally parallel to each other.

8. The breakaway device of claim 1 wherein said leg pipe members are constructed of stainless steel.

9. A fueling station comprising;
   a) storage tank containing a supply of fuel;
   b) a dispensing hose with a first portion in communication with the storage tank and a second portion equipped with a coupling for fueling vehicles;
   c) a breakaway device including a frangible pipe member having an inlet end in communication with the first dispensing hose portion via a first leg pipe member and an outlet end in communication with the second dispensing hose portion via a second leg pipe member, said leg members oriented at an angle relative to the frangible member so that a bending moment acts on the frangible member when opposing forces pull the first and second dispensing hose portions apart;
   d) a pneumatically-actuated dispensing valve for controlling a flow of fuel from the storage tank to the dispensing hose;
   e) a pneumatic line so that pressurized air may be provided to open the dispensing valve;
   f) a first pneumatic line bracket connecting the pneumatic line to the first leg member of the breakaway device and a second pneumatic line bracket connecting the pneumatic line to the second leg member of the breakaway device;
   g) said frangible member of said breakaway device breaking and said pneumatic line rupturing when the sum of the opposing forces pulling the first and second dispensing hose portions exceeds a predetermined value.

10. The fueling station of claim 9 wherein the frangible pipe member of said breakaway device includes a first inner segment connected to the first leg member, a second inner segment connected to the second leg member and a sleeve surrounding and joining said first and second inner segments.

11. The fueling station of claim 10 wherein said first and second inner segments each have a tapered end portion with said tapered end portions configured in an abutting arrangement when surrounded and joined by said sleeve.

12. The fueling station of claim 10 wherein said sleeve is constructed of brass.

13. The fueling station of claim 9 wherein the fuel is liquid natural gas.

14. The fueling station of claim 10 wherein the leg members of said breakaway device are secured to said frangible member by elbows.

15. The fueling station of claim 9 wherein the leg members of said breakaway device are positioned generally perpendicular to the frangible member and generally parallel to each other.

16. The fueling station of claim 9 wherein said leg pipe members are constructed of stainless steel.

17. The fueling station of claim 9 further comprising;
   h) dispensing line in circuit between the storage tank and the dispensing hose and within which the dispensing valve is positioned;
   i) drain line having an inlet and an outlet;
   j) the inlet of said drain line in communication with the first portion of the dispensing hose and the outlet of said drain line in communication with the storage tank; and
   k) a check valve positioned in the drain line so that cryogenic liquid trapped in the first dispensing hose may travel to the storage tank through the drain line when said frangible member of said breakaway device is not broken.

18. The fueling station of claim 17 wherein the inlet of said drain line connects at a lowest level along the dispensing line and dispensing hose.

19. The fueling station of claim 9 further comprising a solenoid valve positioned in said pneumatic line and a controller in communication with said solenoid valve, said controller opening and closing the solenoid valve so that the pressurized air is selectively provided to the dispensing valve.

20. A breakaway device for joining first and second portions of a dispensing hose of a fueling station, where the first dispensing hose portion is connected to the fueling station and the second dispensing hose portion is connected to a coupling that is adapted to removably connect to a vehicle during fueling, the breakaway device comprising:

a) a pair of leg pipe members, each having a distal end and a proximal end, the proximal end of a first one of said leg members adapted to be connected to the first dispensing hose portion and the proximal end of a second one of said-leg members adapted to be connected to the second dispensing hose portion;

b) a frangible pipe member having a first inner segment, a second inner segment and a sleeve, the first inner segment of said frangible member connected to the distal end of the first leg member and the second inner segment of said frangible member connected to the distal end of the second leg member and the sleeve surrounding and joining said first and second inner segments;

c) said leg members positioned generally perpendicular to said frangible member and generally parallel to each other so that a bending moment acts on said frangible member when opposing forces pull the proximal ends of the leg members generally away from one another; and d) said sleeve constructed so as to fracture when sum of the opposing forces pulling the proximal ends of the leg members generally away from one another exceeds a predetermined value.

* * * * *